Nov. 20, 1934.  A. C. DE NAPOLI, JR., ET AL  1,981,690

FIXTURE

Filed Nov. 12, 1931    2 Sheets-Sheet 1

INVENTORS: A. C. DE NAPOLI JR.
J. O. KLEBER
BY
J. MacDonald
ATTORNEY

Nov. 20, 1934.   A. C. DE NAPOLI, JR., ET AL   1,981,690
FIXTURE
Filed Nov. 12, 1931   2 Sheets-Sheet 2
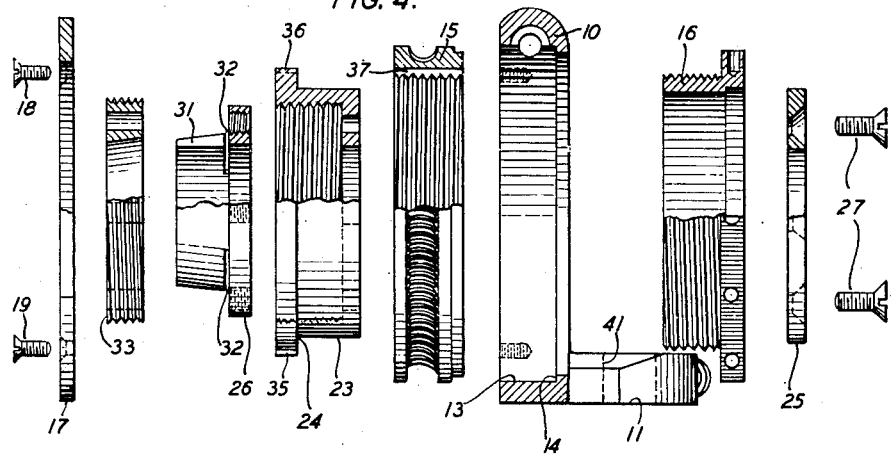
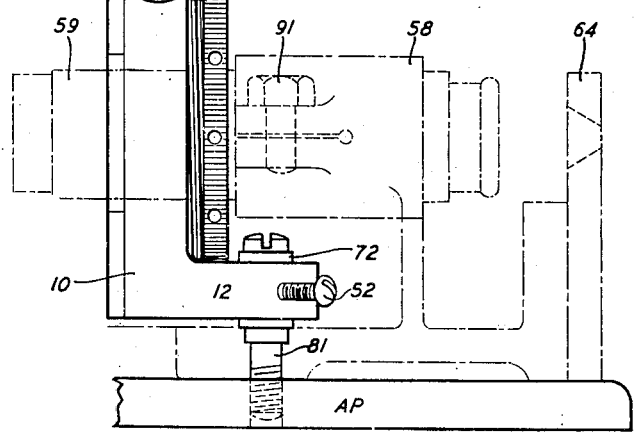
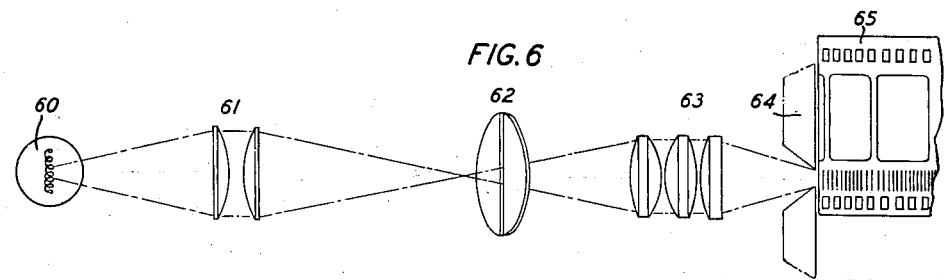
INVENTORS  A. C. DE NAPOLI JR.
J. O. KLEBER
BY J. MacDonald
ATTORNEY Patented Nov. 20, 1934

1,981,690

UNITED STATES PATENT OFFICE 1,981,690

FIXTURE

Anthony C. De Napoli, Jr., East Orange, N. J., and Jackson O. Kleber, Yonkers, N. Y., assignors to Electrical Research Products, Inc., New York, N. Y., a corporation of Delaware Application November 12, 1931, Serial No. 574,508

8 Claims. (Cl. 88—24)

The invention relates to tools or fixtures.

In talking motion picture machines, for example, a mechanism is provided for moving a film in the field of an oblong-shaped light beam for reproducing a sound record, which appears on the film, in synchronism with the picture record. The lenses and the slitted disc, comprising the optical system used for projecting the light beam onto the film, are generally mounted in a tube, in turn supported in a bracket secured to the frame of the machine. On this bracket is also mounted an apertured plate which is provided for guiding the film and to assist in focusing the beam of light on the striations representing the sound record on the film.

In such reproducing machines, however, in order to obtain a maximum electrical response it is necessary that the lens tube, and therefore the light beam, be accurately adjusted as to focus and parallelism with respect to the striations on the film, and deviations in these adjustments, however small, considerably affect the volume and quality of the sound thus reproduced, especially in the sounds included in the high frequency range.

The object of this invention is to provide a tool for adjusting a lens tube under actual reproducing conditions which may be readily attached to the lens tube assembly and removed therefrom.

The fixture or tool of this invention comprises a clamp for attaching the lens tube assembly to the fixture and two mechanisms, one for imparting an axial movement to the tube for the focusing adjustment and the other for imparting a rotary movement to the tube for the parallelism adjustment, either of these adjustments being made without disturbing the other adjustment.

Other features of invention and advantages will appear from the following description and by the claims appended thereto, reference being had to the accompanying drawings in which:

Fig. 4 is an exploded view showing the parts partially in section.

Fig. 5 is a side assembly view showing the fixture in adjusted position on the lens tube and on the mounting plate; and Fig. 6 is a diagrammatic view of the optical system with a portion of the film showing the sound record.

Figure 1:
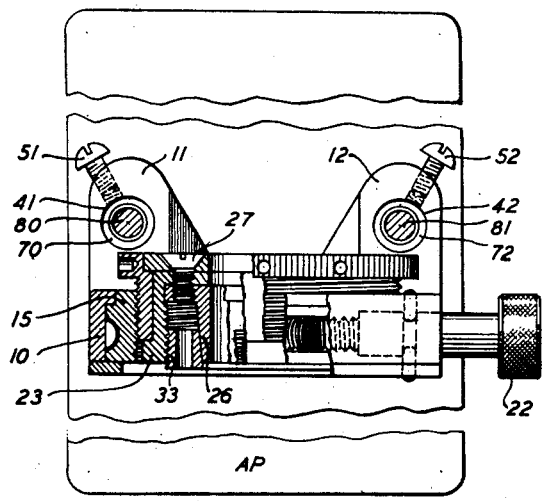
Fig. 1 is a top assembly view of the tool partly in section, also showing a mounting plate used in connection with such tool.

In the drawings, 10 indicates a housing having a base in the form of projections 11 and 12. These projections are provided with apertures 41 and 42 to receive bushings 70 and 72 provided for a purpose that will be hereinafter described in detail.

The housing 10 is provided with a circular aperture 13 formed with a shoulder portion 14 for receiving the bearing portions of a worm wheel 15. A plate 17, which is secured to the frame 10 by screws 18, 19, 20 and 21 cooperates with the shoulder portion 14 for holding the worm wheel 15 against axial movement. Wheel 15 is interiorly threaded for engagement with a peripherally threaded ring 16, and a manually operable worm screw 22 which is journaled at both ends in the mounting 10 as shown in Figs. 1 and 2 is provided for imparting rotary movement to this wheel in either clockwise or counterclockwise direction.

Figure 2:
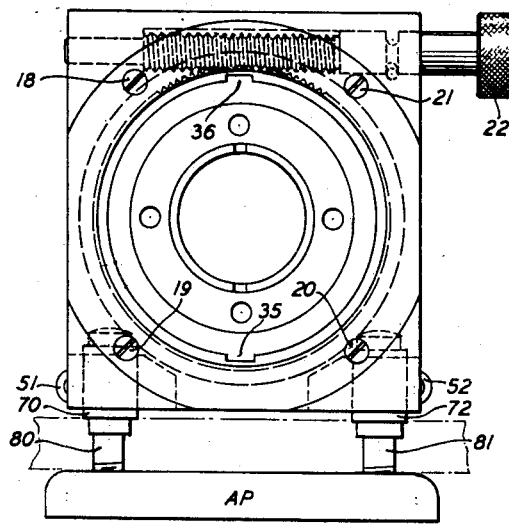
Fig. 2 is a front assembly view.
Figure 3:
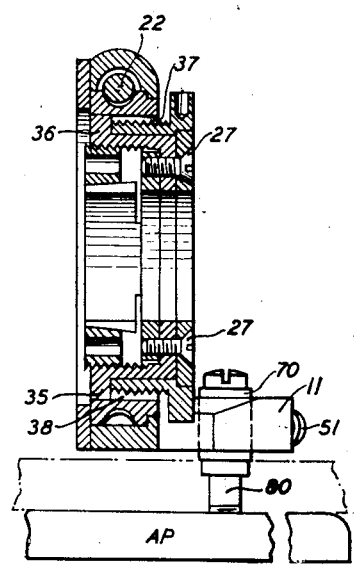
Fig. 3 is a central sectional view.

In the ring 16 is freely mounted a cup-shaped ring 23 which is held against axial movement therein by a shoulder portion 24 abutting the front end of ring 16 and by a plate 25 which serves to secure a clamping ring 26 in the cup-shaped ring 23 by a number of screws, such as 27, shown in Figs. 1, 3 and 4. The cup-shaped ring 23 is provided with two peripherally and oppositely disposed lug members 35 and 36 which engage keyways 37 and 38 in the ring 15 to prevent the rotation of ring 23 upon the operation of ring 16. The clamping ring 26 has a number of longitudinally disposed slots 31 and crosswise slots 32 provided to permit the radial movement of the segmental portions thus formed under the action of a ring 33 threadedly engaging a similar thread in the cup-shaped ring 23 and the tapered periphery of the segments of the clamping ring 26.

The optical system used, but which forms no part of this invention, is shown in Fig. 6 and generally consists of a lamp 60, condenser lenses 61, a slitted disc 62, objective lenses 63 and an apertured plate 64 disposed adjacent the film 65. The plate 64 is secured to a bracket 58 which also supports a tube 59 provided for housing the lenses 61 and 63 and the disc 62, the bracket and the tube being shown diagrammatically in Fig. 5.

In a typical adjustment operation, the bracket 58 and the tube 59 mounted therein are first removed from the frame of the machine (not shown) and the fixture is placed on the tube 59 with bushings 70 and 72 shown in Figs. 1, 2, 3 and 5 engaging the apertures 41 and 42 of projections 11 and 12 and countersunk holes in the bracket 58 which support the lens tube. The fastening screws 80 and 81 shown in Figs. 1 and 5 are tightened in order to secure the bracket 58 to the assembly plate AP. The set screws 51 and 52 are then tightened and the tube secured to the fixture through the operation of clamping ring 26 as above described, after which the screws 80 and 81 are unscrewed and the plate AP removed. It will be found that the fixture is positively attached to the lens tube 59 and that the loosening of the screw 91 which secures the lens tube in the bracket in the well known manner is ineffective to disturb the adjustment of the fixture due to the engagement of bushings 70 and 72 with the fixture and the bracket 58. The bracket and the tube together with the fixture attached thereto are mounted on the frame of the machine and secured thereto by the screws 80 and 81 and the fixture is now ready for the actual adjustment of the lens tube which is effected by a rotary movement of ring 16, the operation of which is effective to move the ring 26 and the lens tube clamped thereto, in an axial direction for the focusing adjustment of the light beam.

The rotary adjustment of the lens tube is effected by the movement of the worm screw 22, the operation of which is effective to impart a rotary movement to the tube through the engagement of lugs 35 and 36 in the key-ways 37 and 38 of the worm wheel 15, but it is to be noted that the rotary movement of the clamping device and the lens tube clamped thereto in no way affects the axial adjustment of the tube. Such adjustment is best performed with the aid of certain power level indicators connected in the amplifier circuit used in connection with sound reproducing machines, such indicators registering maximum electrical response when the focus adjustment is properly effected, and the beam of light as obtained by the slitted disc 62 is in exact parallelism with the striations representing the sound record on the film. Upon the completion of the lens tube adjustment the clamping screw 91 of the bracket 58 is tightened for clamping the tube in the bracket and the clamping device of the fixture loosened, then the bracket and the tool are removed from the frame of the machine and the bracket supporting the tube put in place again on the frame without the tool.

What is claimed is:

1. A fixture for adjusting the lens tube assembly of a talking motion picture machine having a bracket for the lens tube, said fixture comprising a pair of mechanisms for adjusting the tube in two directions, one of said mechanisms operating for imparting an axial movement to the lens tube in said bracket and the other of said mechanisms operating for imparting a movement at an angle with respect to said axial movement said mechanisms operating independently of each other, and each operating without altering the adjustment effected by the other, and a plurality of means for attaching and removing said fixture from the lens tube and said bracket, the lens tube remaining in adjusted position in said bracket.

2. A fixture for adjusting the lens tube assembly of a talking motion picture machine having a bracket for the lens tube, said fixture comprising means for imparting an axial movement to the tube, means for imparting a rotary movement to the tube, either means operating without altering the adjustment effected by the other, means for attaching and removing said fixture from said bracket means for attaching and removing said fixture from the lens tube and means for securing said lens tube in said bracket after the operation of the first and second mentioned means.

3. A fixture for adjusting the lens tube with respect to a film in a talking motion picture machine, said fixture comprising a mounting having a base for securing it on the machine, a worm wheel arranged for rotary movement in said mounting, a ring threadedly engaging said worm wheel, a cup-shaped ring mounted in the second mentioned ring and having lugs engaging keyways in the worm wheel, a device for clamping the lens tube in said fixture carried by the cup-shaped ring, whereby a movement of the worm wheel is effective to impart a rotary movement to the lens tube and a movement of the first mentioned ring is effective to impart an axial movement to the lens tube for adjustment with respect to the film.

4. A fixture for adjusting the lens tube with respect to a film in a talking motion picture machine, said fixture comprising a mounting, a worm wheel arranged for rotary movement in said mounting and having an interiorly disposed keyway, a ring threadedly engaging said worm wheel, a cup-shaped member freely mounted in said ring and having a lug engaging the key-way of said worm wheel, a ring carried by said member having peripherally disposed tapered lug portions and another ring threadedly engaging the last mentioned ring and said tapered portion for clamping the lens tube to said fixture, whereby the independent movement of said worm wheel and the first mentioned ring are effective to move the tube in adjusted position with respect to the film.

5. A fixture for adjusting a lens tube assembly used for projecting a beam of light on a sound record printed on a photographic film, said fixture comprising a housing having means for removably securing it to the lens tube support, a clamping device in said housing removably engaging said lens tube, a plurality of means operable for moving said device in a plurality of directions relative to said housing for adjusting the lens tube with respect to the record, and means for holding said lens tube when disengaging said fixture.

6. A fixture for adjusting a lens tube assembly used for projecting a beam of light of rectangular cross-section on a sound record in the form of striations on a photographic film, said fixture comprising a housing, a clamping device in said housing engaging the lens tube, and a plurality of means for moving said device in a number of directions relative to said housing for moving the lens tube in its support in a number of angular directions for adjustment of the light beam as to focus and parallelism with respect to the striations, said fixture being removable from said support and the lens tube upon the adjustment of the latter.

7. A fixture for adjusting a lens tube assembly used for projecting a beam of light of a rectangular cross-section on a sound record in the form of a row of parallelly disposed striations on a photographic film, said fixture comprising a housing having means for securing it to the support of the lens tube, a clamping device for securing said fixture to the lens tube, means for actuating said clamping device relative to the support of the lens tube for rotating the latter for adjusting the parallelism of the light beam with respect to the striations and a member operable for actuating said clamping device another way relative to said housing for moving the lens tube in its support axially for focussing the beam of light on the striations on said film, said fixture being removable from said support and lens tube after adjustment of the latter.

8. The method of adjusting a lens tube assembly used for projecting a beam of light of a rectangular cross-section on a sound record in the form of parallelly disposed striations on a photographic film, which method consists in clamping the lens tube to the operating mechanisms of an adjusting fixture, in turn, secured to the lens tube support, operating one of the mechanisms for imparting an axial movement to the lens tube in its support, operating the second mechanism for rotating the lens tube for adjusting the light beam with respect to the striations on the film, securing the lens tube on its support and removing the fixture from the lens tube and its support.

ANTHONY C. DE NAPOLI, Jr.
JACKSON O. KLEBER.